United States Patent
Mietke

(10) Patent No.: US 12,189,518 B2
(45) Date of Patent: Jan. 7, 2025

(54) EVALUATION AND UPDATE OF TEST CODE WITH RESPECT TO PRODUCTION CODE CHANGES

(71) Applicant: SAP SE, Walldorf (DE)

(72) Inventor: Sebastian Mietke, Reilingen (DE)

(73) Assignee: SAP SE, Walldorf (DE)

( * ) Notice: Subject to any disclaimer, the term of this patent is extended or adjusted under 35 U.S.C. 154(b) by 105 days.

(21) Appl. No.: 17/674,143

(22) Filed: Feb. 17, 2022

(65) Prior Publication Data
US 2023/0259449 A1 Aug. 17, 2023

(51) Int. Cl.
G06F 9/44 (2018.01)
G06F 11/36 (2006.01)

(52) U.S. Cl.
CPC ........ G06F 11/368 (2013.01); G06F 11/3688 (2013.01)

(58) Field of Classification Search
None
See application file for complete search history.

(56) References Cited

U.S. PATENT DOCUMENTS

| | | | |
|---|---|---|---|
| 6,275,223 B1 | 8/2001 | Hughes | |
| 6,662,312 B1 * | 12/2003 | Keller | G06F 11/3688 717/124 |
| 7,093,235 B2 | 8/2006 | Andrews et al. | |
| 7,219,279 B2 | 5/2007 | Chandra et al. | |
| 7,587,636 B2 | 9/2009 | Tillmann et al. | |
| 7,712,087 B2 | 5/2010 | Kogan et al. | |
| 8,108,759 B2 | 1/2012 | Moon et al. | |
| 8,127,275 B1 | 2/2012 | Hampapuram | |
| 8,225,302 B2 | 7/2012 | Waugh et al. | |
| 8,356,278 B2 | 1/2013 | Drissi et al. | |
| 8,365,148 B2 | 1/2013 | Millmore | |
| 8,561,021 B2 | 10/2013 | Muharsky et al. | |
| 8,566,794 B2 | 10/2013 | Rossi et al. | |
| 8,578,336 B1 | 11/2013 | Wiradarma et al. | |
| 8,661,415 B2 | 2/2014 | Fanning et al. | |

(Continued)

OTHER PUBLICATIONS

Dowey, "How to Reduce the Technical Debt of Custom ABAP Code," IntelliCorp Blog, Nov. 1, 2017, 15 pages.

(Continued)

*Primary Examiner* — Wei Y Zhen
*Assistant Examiner* — Lanny N Ung
(74) *Attorney, Agent, or Firm* — Klarquist Sparkman, LLP

(57) ABSTRACT

Techniques and solutions are described for automatically updating test code based on changes, including additions or deletions, to production code. Requests to analyze production code and a modification to production code are received. The modification is applied to the production code to provide modified production code. Test code specific for the production code is executed on the modified production code. It is determined that a test specified in the test code was failed by the modified production code. A condition responsible for test failure is identified, where the condition specifies at least one expected value or at least one expected result. A modification to update the test code is determined, where the modification includes an actual value or an actual result obtained during execution of the failed test. The modification to the test code is applied to provide modified test code.

18 Claims, 13 Drawing Sheets

(56) References Cited

U.S. PATENT DOCUMENTS

| | | | |
|---|---|---|---|
| 8,762,950 | B2 | 6/2014 | Beasley et al. |
| 8,839,211 | B2 | 9/2014 | Kaulgud et al. |
| 8,990,764 | B2 | 3/2015 | Armstrong et al. |
| 9,009,862 | B2 | 4/2015 | Tsantilis et al. |
| 9,081,595 | B1 | 7/2015 | Delaure et al. |
| 9,189,317 | B1 | 11/2015 | Marimuthu |
| 9,229,846 | B1* | 1/2016 | Budhai ............... G06F 11/3624 |
| 9,235,493 | B2 | 1/2016 | Goetsch |
| 9,235,494 | B2 | 1/2016 | Gautam |
| 9,268,665 | B2 | 2/2016 | Barrow et al. |
| 9,354,867 | B2 | 5/2016 | Jain et al. |
| 9,389,984 | B2 | 7/2016 | Chockler et al. |
| 9,405,662 | B2 | 8/2016 | Ivankovic et al. |
| 9,411,578 | B2 | 8/2016 | Henriksen et al. |
| 9,430,194 | B1 | 8/2016 | Childs et al. |
| 9,465,609 | B2 | 10/2016 | Balasubramanian et al. |
| 9,507,698 | B2 | 11/2016 | Vikutan et al. |
| 9,535,821 | B1 | 1/2017 | Delaure et al. |
| 9,619,363 | B1 | 4/2017 | Chitale et al. |
| 9,645,817 | B1 | 5/2017 | Van Schaik |
| 9,658,907 | B2 | 5/2017 | Rodmell |
| 9,690,690 | B1 | 6/2017 | Henriksen |
| 9,870,306 | B2 | 1/2018 | Chandra et al. |
| 10,095,602 | B2 | 10/2018 | Gautam et al. |
| 10,120,656 | B1 | 11/2018 | Singh et al. |
| 10,152,403 | B2 | 12/2018 | Kraft et al. |
| 10,166,673 | B2 | 1/2019 | Orman et al. |
| 10,175,975 | B2 | 1/2019 | Kolesnik et al. |
| 10,289,532 | B2 | 5/2019 | Jain et al. |
| 10,338,986 | B2 | 7/2019 | Grealish et al. |
| 10,360,140 | B2 | 7/2019 | Shor et al. |
| 10,423,410 | B1 | 9/2019 | Goyal et al. |
| 10,452,525 | B2 | 10/2019 | Farchi et al. |
| 10,482,000 | B2 | 11/2019 | Vikjord |
| 10,496,379 | B2 | 12/2019 | Pragya et al. |
| 10,664,382 | B2 | 5/2020 | Jose et al. |
| 10,853,231 | B2 | 12/2020 | Guenther et al. |
| 11,481,311 | B2 | 10/2022 | Mietke |
| 2003/0041315 | A1 | 2/2003 | Bates et al. |
| 2004/0015910 | A1 | 1/2004 | Tonouchi |
| 2006/0036910 | A1 | 2/2006 | Fung et al. |
| 2006/0271824 | A1* | 11/2006 | Kwong ............... G06F 11/3688 |
| | | | 714/38.12 |
| 2007/0044075 | A1 | 2/2007 | Koning et al. |
| 2008/0086499 | A1* | 4/2008 | Wefers ............. G06Q 10/06375 |
| | | | 707/999.102 |
| 2008/0115114 | A1 | 5/2008 | Palaparthi |
| 2008/0120602 | A1 | 5/2008 | Comstock et al. |
| 2008/0270989 | A1 | 10/2008 | Ahadian et al. |
| 2009/0070734 | A1 | 3/2009 | Dixon et al. |
| 2009/0199160 | A1 | 8/2009 | Vaitheeswaran et al. |
| 2009/0287729 | A1 | 11/2009 | Chen et al. |
| 2010/0017788 | A1 | 1/2010 | Bronkhorst et al. |
| 2010/0023928 | A1 | 1/2010 | Hentschel et al. |
| 2010/0211932 | A1 | 8/2010 | Jones et al. |
| 2010/0251027 | A1 | 9/2010 | Yawalkar et al. |
| 2010/0269096 | A1* | 10/2010 | Araya ................. G06F 16/8373 |
| | | | 717/113 |
| 2011/0022551 | A1 | 1/2011 | Dixon |
| 2011/0197176 | A1 | 8/2011 | Muharsky et al. |
| 2011/0239194 | A1 | 9/2011 | Braude |
| 2012/0089964 | A1 | 4/2012 | Swano |
| 2012/0096438 | A1 | 4/2012 | Rossi et al. |
| 2012/0102458 | A1 | 4/2012 | Meijer et al. |
| 2012/0167057 | A1 | 6/2012 | Schmich et al. |
| 2013/0074036 | A1 | 3/2013 | Brandt et al. |
| 2013/0124927 | A1 | 5/2013 | Balko |
| 2013/0139004 | A1 | 5/2013 | Korgi et al. |
| 2013/0152043 | A1 | 6/2013 | Kuzmin |
| 2013/0198800 | A1 | 8/2013 | Bezilla et al. |
| 2013/0305224 | A1 | 11/2013 | Eade et al. |
| 2014/0047265 | A1 | 2/2014 | Das et al. |
| 2014/0223238 | A1* | 8/2014 | Allen .................... G06F 21/00 |
| | | | 714/38.1 |
| 2015/0135166 | A1 | 5/2015 | Tarlow et al. |
| 2015/0286556 | A1 | 10/2015 | Ellis et al. |
| 2015/0301806 | A1 | 10/2015 | Leon et al. |
| 2015/0378880 | A1 | 12/2015 | Kucharski et al. |
| 2016/0034334 | A1 | 2/2016 | Sadovsky et al. |
| 2016/0054983 | A1 | 2/2016 | Balasbramanian et al. |
| 2016/0147633 | A1* | 5/2016 | Yoshida ................... G06F 8/71 |
| | | | 717/124 |
| 2016/0154725 | A1 | 6/2016 | Lopian et al. |
| 2016/0342451 | A1 | 11/2016 | Ly |
| 2017/0024269 | A1 | 1/2017 | Shuvall et al. |
| 2017/0147336 | A1 | 5/2017 | Medlyn |
| 2017/0147471 | A1* | 5/2017 | Shadi .................. G06F 11/3624 |
| 2017/0235662 | A1 | 8/2017 | Leask |
| 2017/0235664 | A1 | 8/2017 | Henrikson et al. |
| 2017/0270030 | A1* | 9/2017 | Cai ...................... G06F 11/3684 |
| 2017/0293546 | A1 | 10/2017 | Frontiero et al. |
| 2017/0315903 | A1 | 11/2017 | David et al. |
| 2018/0089066 | A1 | 3/2018 | Barnett et al. |
| 2018/0121329 | A1 | 5/2018 | Lo et al. |
| 2018/0173610 | A1 | 6/2018 | Lee et al. |
| 2018/0189165 | A1 | 7/2018 | Yamada et al. |
| 2018/0217922 | A1 | 8/2018 | Clement |
| 2018/0276104 | A1 | 9/2018 | Calla et al. |
| 2018/0276562 | A1 | 9/2018 | Woulfe et al. |
| 2018/0300227 | A1 | 10/2018 | Bergen |
| 2019/0042369 | A1 | 2/2019 | Deutsch et al. |
| 2019/0108001 | A1 | 4/2019 | Hauser |
| 2019/0121636 | A1 | 4/2019 | Neatherway |
| 2019/0361795 | A1 | 11/2019 | Cole et al. |
| 2020/0019493 | A1* | 1/2020 | Ramakrishna ...... G06F 11/3688 |
| 2020/0183818 | A1 | 6/2020 | Guenther et al. |
| 2021/0073110 | A1 | 3/2021 | Vidal et al. |
| 2021/0342258 | A1* | 11/2021 | Ishay .................. G06F 11/3664 |
| 2021/0390038 | A1 | 12/2021 | Mietke et al. |
| 2022/0350730 | A1* | 11/2022 | Adachi ............... G06F 11/3688 |

OTHER PUBLICATIONS

"Code Inspector" SAP, retrieved from: https://help.sap.com/saphelp_nwpi71/helpdata/en/8d/4b64488cce3945ba42b059319d62dc/content.htm?no_cache=true, at least as early as May 11, 2020, 2 pages.

"SAP Code Inspector (SCI) Tutorial," retrieved from https://blogs.sap.com/2011/02/11/sap-code-inspector-sci-tutorial/, Feb. 11, 2011, 14 pages.

"Code Inspector" SAP Help Portal, retrieved from: https://help.sap.com/viewer/ba879a6e2ea04d9bb94c7ccd7cdac446/7.51.6/en-US/49205531d0fc14cfe10000000a42189b.html, at least as early as May 11, 2020, 7 pages.

"Evaluating the Quality of Your ABAP with Code Inspector—Part 2," retrieved from: https://itpsap.com/evaluating-quality-abap-code-inspector-part-2/, Jun. 15, 2014, 10 pages.

ABAP Test Cockpit (ATC) Introduction and Steps, retrieved from: https://sapyard.com/abap-test-cockpitatc-introduction-and-steps/, Aug. 6, 2017, 11 pages.

Li, "Integrate ATC(ABAP Test Cockpit) or Code Inspector check with ChaRM," retrieved from: https://blogs.sap.com/2015/07/12/integrate-atcabap-test-cockpit-or-code-inspector-check-with-charm/, Jul. 12, 2015, 10 pages.

Dolinskaja, "Getting Started with the ABAP Test Cockpit for Developers," retrieved from: https://blogs.sap.com/2012/10/18/getting-started-with-the-abap-test-cockpit-for-developers/, Oct. 18, 2012, 15 pages.

Deliver SAP Updates 85% Faster with 100% Risk Coverage, Tricentis Live Compare, retrieved from: https://www.tricentis.com/products/livecompare-impact-analysis-sap/, at least as early as May 11, 2020, 11 pages.

Robert Baggen et al., "Standardized code quality benchmarking for improving software maintainability," Software Qual J.—May 18, 2011, 21 pages.

Patrick Knab et al., "Predicting Defect Densities in Source Code Files with Decision Tree Leaners," MSR ' 06, May 22-23, 2006, Shanghai China, 7 pages.

Unit Testing in ABAP, https://help.sap.com/viewer/c238d694b825421f940829321ffa326a/7.5.9/en-US/4ec18be06e391014adc9fffe4e204223.html, at least as early as Jun. 10, 2020, 4 pages.

(56) References Cited

OTHER PUBLICATIONS

An Introduction to ABAP Unit Part 1, https://itpfed.com/an-introduction-to-abap-unit-part-1/, Feb. 14, 2019, 8 pages.
Mehra, "ABAP Units—Test a Little Implement a Little, Reflect a Little," https://sapyard.com/abap-units-test-a-little-implement-a-little-reflect-a-little/, May 19, 2019, 20 pages.
Patel., "ABAP Unit Test Driven Development—Basic Example," zevolving.com/2013/04/abap-unit-test-driven-development-basic-example/, Apr. 18, 2013.
Wood, ABAP Unit: Writing and Executing Unit Tests, https://www.sap-press.com/abap-unit-writing-and-executing-unit-tests_4298/, at least as early as Jun. 10, 2020, SAP Press, chapter 9, 41 pages.
Murugesan, "Understanding "ABAP Unit"" http://saptechnical.com/Tutorials/OOPS/ABAPUnit/Index.htm, at least as early as Jun. 10, 2020, 3 pages.
Shambhavi V, "SAP ABAP Unit test class with Test double," https://blogs.sap.com/2018/11/19/sap-abap-unit-test-class-with-test-double/, Nov. 19, 2018, 8 pages.
Göktas, "ABAP on HANA: Implementing AMDP," https://zbap.net/abap-on-hana-implementing-amdp-be5209fdde93?gi=5a7eda9763b2, May 18, 2017, 6 pages.
Using Constraints, http://saphelp.ucc.ovgu.de/NW750/EN/73/a417fb3e80462980dd4caf0a653041/frameset.htm in ABAP Unit Testing, at least as early as Jun. 10, 2020, 3 pages.
Beemanati, "SAP Code Inspector (SCI) Tutorial," https://blogs.sap.com/2011/02/11/sap-code-inspector-sci-tutorial/, Feb. 11, 2011, 15 pages.
Code Inspector, https://help.sap.com/viewer/ba879a6e2ea04d9bb94c7ccd7cdac446/7.51.6/en-US/49205531d0fc14cfe10000000a42189b.html, at least as early as Jun. 10, 2020, 7 pages.
ABAP Test Cockpit(ATC)—Introduction and Steps, https://sapyard.com/abap-test-cockpitatc-introduction-and-steps/, Aug. 6, 2017, 14 pages.
Li, "Integrate ATC(ABAP Test Cockpit) or Code Inspector check with ChaRM," https://blogs.sap.com/2015/07/12/integrate-atcabap-test-cockpit-or-code-inspector-check-with-charm/, Jul. 12, 2015, 10 pages.
Dolinskaja, "Getting Started with the ABAP Test Cockpit for Developers," https://blogs.sap.com/2012/10/18/getting-started-with-the-abap-test-cockpit-for-developers/, Oct. 18, 2012, 13 pages.
Code Inspector, https://help.sap.com/saphelp_nwpi71/helpdata/en/8d/4b64488cce3945ba42b059319d62dc/content.htm?no_cache=true, at least as early as Jun. 10, 2020, 2 pages.
Methods of Class CL_ABAP_UNTI_ASSERT, https://help.sap.com/saphelp_sm71_sp13/helpdata/en/49/268dc67b6716b4e10000000a42189d/content.htm?no_cache=true, at least as early as Jun. 10, 2020, 3 pages.
Difference between Value Table and Check Table, https://www.stechies.com/difference-between-value-table-check-table/, Sep. 25, 2012, 5 pages.
ABAP Keyword Documentation, log_exp—Relational Operators for All Data Types, https://help.sap.com/doc/abapdocu_731_index_htm/7.31/en-US/abenlogexp_any_operand.htm, at least as early as Feb. 17, 2022, 1 page.
ABAP Keyword Documentation, rel_exp—Is Bound, https://help.sap.com/doc/abapdocu_751_index_htm/7.51/en-us/abenlogexp_bound.htm, at least as early as Feb. 17, 2022, 1 page.
Bindi, Initial vs Not Bound, https://answers.sap.com/questions/2982532/initial-vs-not-bound.html, Sep. 19, 2007, 6 pages.
Keller, "Invalid References in Reference Variables," https://blogs.sap.com/2016/10/14/invalid-references/, Oct. 14, 2016, 9 pages.
"Binding to Object References (Instances)", retrieved from https://help.sap.com/saphelp_scm50/helpdata/en/c3/021959f06111d4b2eb0050dadfb92b/frameset.htm on or before Feb. 2018, 10 pp.
Chellappa, V., "Working with Inheritance", retrieved from http://saptechnical.com/Tutorials/OOPS/Inheritance/demo.htm, on or before Feb. 2018, 4 pp.
"Comments", retrieved from https://help.sap.com/doc/abapdocu_751_index_htm/7.51/en-US/abencomment.htm, on or before Feb. 2018, 2 pp.
Hughes, G., et al. "Extended interface grammars for automated stub generation", Proceeding AFM 2007: Proceedings of the second workshop on Automated formal methods Nov. 6, 2007, 42-50, 10 pp.
"Import Parameters Passed by Reference and Passed by Value", retrieved from http://sapabap-4.blogspot.com/2013/03/import-parameters-passed-by-reference.html on or before Feb. 2018, 5 pp.
Keller, H., "ABAP News for Release 7.50—Test Seams and Test Injections", retrieved from https://blogs.sap.com/2015/10/23/abap-news-for-750-test-seams-and-injections/ on or before Feb. 2018, 21 pp.
Krawcyzk, A., "Creating ABAP unit tests", retrieved from https://blogs.sap.com/2013/04/15/creating-abap-unit-tests-in-eclipse-and-se80/, on or before Feb. 2018, 15 pp.
"local class and global class types?", retrieved from https://archive.sap.com/discussions/thread/905993, on or before Feb. 2018, 9 pp.
Mehnert, S. "ABAP Unit Testing: Encapsulate Database using a local Classes", retrieved from https://blogs.sap.com/2015/07/13/abap-unit-testing-encapsulate-database-access-in-local-classes/ on or before Feb. 2018, 10 pp.
"Methods of Class CL_ABAP_UNIT_ASSERT", retrieved from https://help.sap.com/doc/ba879a6e2ea04d9bb94c7ccd7cdac446/7.5.6/en-US/49268dc67b6716b4e10000000a42189d.html, on or before Feb. 2018, 3 pp.
Patel, N., "ABAP Unit Test Class Wizard", retrieved from http://zevolving.com/2014/07/abap-unit-test-class-wizard/, on or before Feb. 2018, 12 pp.
Patel, N., "ABAP Unit Test Driven Development—Basic Example", retrieved from http://zevolving.com/2013/04/abap-unit-test-driven-development-basic-example/, on or before Feb. 2018, 5 pp.
Patel, N., "ABAP Unit Test Fixture Methods", retrieved from http://zevolving.com/2013/05/abap-unit-test-fixture-methods/, on or before Feb. 2018, 4 pp.
Patel, N., "When to use Local Class and when not to!", retrieved from http://zevolving.com/2012/01/when-to-use-local-class-and-when-not-to/, on or before Feb. 2018, 5 pp.
"SAP ABAP—Classes", retrieved from http://www.tutorialscampus.com/tutorials/sap-abap/sap-abap-classes.htm, on or before Feb. 2018, 16 pp.
"Test-Injection", retrieved from https://help.sap.com/doc/abapdocu_750_index_htm/7.50/en-US/abaptest-injection.htm on or before Feb. 2018, 3 pp.
"Using the ABAP Unit Wizard", retrieved from https://help.sap.com/saphelp_nwpi71/helpdata/en/47/29180dafbd475891697ec0e7bc64e2/frameset.htm on or before Feb. 2018, 2 pp.
Weber, P., "ABAP Unit Test Wizard", retrieved from http://weberpatrick.de/abap-unit-test-wizard/ on or before Feb. 2018, 10 pp.
Yoon, Supporting Selective Undo in a Code Editor, http://ieeexlore.ieee.org/stamp/stamp.jsp?tp=&arnumber=7194576 (Year 2015) 2015, pp.
ABAP unit test with setup & teardown methods, https://sapcodes.com/2016/12/24/abap-unit-test-with-setup-teardown-methods/, 2016, pp. 1-25.
Beller, Developer Testing in the IDE: Patterns, Beliefs and Behavior, 2016, http://www.gousios.gr/pub/developer-testing-in-IDE.pdf (Year 2016).
Marsavina, Studying Fine-Grained Co-Evolution Patters of Production and Test Code, 2014, https://ieeexplore.ieee.org/stamp/stamp.jsp?tp=&arnumber=6975653 (Year 2014).
Non-Final Office Action received in U.S. Appl. No. 16/216,046, Feb. 14, 2020, 22 pages.
Final Office Action received in U.S. Appl. No. 16/216,046, Jun. 24, 2020, 27 pages.
Notice of Allowance received in U.S. Appl. No. 16/216,046, Sep. 4, 2020, 7 pages.
Non-Final Office Action received in U.S. Appl. No. 16/898,170, Nov. 24, 2021, 25 pages.

(56) References Cited

OTHER PUBLICATIONS

Notice of Allowance received in U.S. Appl. No. 16/898,170, Jun. 16, 2022, 15 pages.
Non-Final OA received in U.S. Appl. No. 15/891,185, Jan. 24, 2019, 32 pages.
Notice of Allowance received in U.S. Appl. No. 15/891,185, Aug. 5, 2019, 23 pages.

\* cited by examiner

Initial Code for actual method

```
method SEARCH_FLIGHTS_ECONOMY.                           110
    TEST-SEAM fetch_planetype.              112          114
        CALL METHOD ME -> GET_PLANE_TYPE
        IF ( PLANE_TYPE != NULL) CALL METHOD ME-> GET_SEATS.
    end-test-seam.     116
    SELECT * from sflight as a   INNER JOIN spfli as b
        Loop at lt_flight_all into ls_flight.
            IF ( ls_flight-SEATSMAX - ls_flight-SEATSOCC ) GE iv_ticket_count.
*               TEST-SPOT check_currency             ls_flight-CURRENCY
                                              124
*               TEST-SPOT check_paymentsum           ls_flight-PAYMENTSUM
                APPEND ls_flight to lt_flight_sel.   126
            ENDIF.
        ENDLOOP.                      140
*       TEST-STUB calculate.   142
        CALL METHOD ME->CALCULATE .
*   End-test-stub.     144
                    148
    LOOP AT lt_flight_sel ASSIGNING <fs_flight>.
        IF <fs_flight> is ASSIGNED.
            <fs_flight>->price = <fs_flight>->price - ( <fs_flight>->price * lv_discount / 100 ).
        ENDIF.                128
*       TEST-SPOT final_table       lt_flight_sel
        et_sflight = lt_flight_sel.
    ENDLOOP.
endmethod.
```

100

102

Test Code generated in Global Class

```
                                                       110
method SEARCH_FLIGHTS_ECONOMY.
                                       114
    TEST-SEAM fetch_planetype.
        PLANE_TYPE = '747'.
        SEAT = 120;        120
    end-test-seam.      116
    SELECT * from sflight as a   INNER JOIN spfli as b
        Loop at lt_flight_all into ls_flight.
            IF ( ls_flight-SEATSMAX - ls_flight-SEATSOCC ) GE iv_ticket_count.
*               TEST-SPOT check_currency             ls_flight-CURRENCY
                cl_abap_unit_assert=>ASSERT_EQUALS( act = ls_flight-CURRENCY
                                          126
                exp = 'USD'        130
                msg = 'Invalid currency' ).
                         124
*               TEST-SPOT check_paymentsum           ls_flight-PAYMENTSUM
                APPEND ls_flight to lt_flight_sel.
            ENDIF.
        ENDLOOP.
*       TEST-STUB calculate.        142             150
        CALL METHOD ME->STUB_CALCULATE .
*   End-test-stub.    144
    LOOP AT lt_flight_sel ASSIGNING <fs_flight>.
        IF <fs_flight> is ASSIGNED.
            <fs_flight>->price = <fs_flight>->price - ( <fs_flight>->price * lv_discount / 100 ).
        ENDIF.              128
*       TEST-SPOT final_table       lt_flight_sel
        et_sflight = lt_flight_sel.
    ENDLOOP.
endmethod.
```

FIG. 1

```
METHOD check_budget.  "Method of class "CL_BUDGET_CHECK".
  "This is a very central check method, which performs a lot of important checks.
  "Most of the checks are not shown here, just the block, which has been changed slightly:
  IF iv_budget_planned - iv_budget_spent - iv_budget_shared LE 0.  "Where LE is less than or equal to
    ls_warning-msgno = '014'.
    APPEND ls_warning TO ct_message.
  ELSE.
    ls_warning-msgno = '011'.
    APPEND ls_warning TO ct_message.
  IF iv_budget_shared NE 0.  "This IF block has been added, providing
    ls_warning-msgno = '015'.  "a new message in certain cases, where NE is not equal to.
    APPEND ls_warning TO ct_message.
  ENDIF.
  ENDIF.
  "Continuing with unchanged checks...
ENDMETHOD.
```

FIG. 6

```
704  METHOD check_warning. "For testing
                              "Provide some budget information.
     ls_budget_data = ...
     lt_exp_message = VALUE #( ( msgid = 'ABC'
                                 msgno = '011'
                                 msgty = warning ) ).          720
                                                               708
     lt_act_messge = cut->check_budget( ls_budget_data ).
712  ASSERT lt_act_messge = lt_exp_message.
                                           716
     ENDMETHOD.
```

```
Pseudo-code:

UNIT_TEST_OK = ATE->EXECUTE_UNIT_TEST( CL_BUDGET_CHECK )->GET_STATUS( ).

IF UNIT_TEST_OK == FALSE.                                              ↘804

"Unit tests are failing. Notify the developer.

WRITE NOTIFICATION: "Unit test contains already errors. Please correct before
                       changing the productive code."

ELSE.

"Unit tests are OK. Continue with copying the productive object.

SAS->COPY_CLASS_TO_LOCAL( CL_BUDGET_CHECK ).
                                                    820
  SAS->OPEN_LOCAL_COPY_IN_NEW_WINDOW( ).

WRITE NOTIFICATION: "Please go ahead performing the changes."

WHILE ADJUSTMENT_FINISHED = FALSE.

WHILE DEV_INPUT_FINISHED = FALSE.

"Wait.

ENDWHILE.       824

UNIT_TEST_OK = ATE->EXECUTE_UNIT_TEST( CL_BUDGET_CHECK )->GET_STATUS( ).

IF UNIT_TEST_OK = FALSE. "This is expected, otherwise the unit tests are bad.

FAILED_UNIT_TESTS = ATE->EXECUTE_UNIT_TEST( CL_BUDGET_CHECK )->GET_FAILED( ).

LOOP AT FAILED_UNIT_TESTS INTO FAILED_TEST.

WRITE NOTIFICATION: FAILED_TEST + "Failed".

"Which ASSERT failed why.              828

ADJUSTMENT_FINISHED = TAA->ANALYZE_ASSRTIONS( FAILED_TEST ).

ENDLOOP.                                  832

ELSE.

WRITE NOTIFICATION: "The unit tests are still OK. The quality of the unit
           836          tests might be insufficient."

ENDIF.

ENDWHILE.

POA->COPY_LOCAL_TO_PRODUCTIVE( ).

POA->SAVE( ).

POA->ACITVATE( ).

WRITE NOTIFICATION: "The object has been copied to productive version,
                       successfully."

ENDIF.
```

FIG. 8

```
Pseudo-code of ANALYZE_ASSERTIONS, importing FAILED_TEST (of type unit test    900
results):

LOOP AT FAILED_TEST-REASON_TO_FAIL INTO REASON.
  CASE REASON-ASSERT_TYPE.
    WHEN "INITIAL".
910   WRITE NOTIFICATION: "The field " + REASON-FIELD + " was expected to be
                          initial."
      WRITE NOTIFICATION: "Should the expected value be cleared?"
    WHEN "NOT INITIAL".                                        920
912   WRITE NOTIFICATION: "The field " + REASON-FIELD + " was expected to be
                          not initial."
      WRITE NOTIFICATION: "Should the expected value be set to "
          914             + REASON-FIELD_VALUE_ACTUAL + "?"
    WHEN "EQUAL".                                              922
      WRITE NOTIFICATION: "The content of " + REASON-FIELD + " was expected as "
                          + REASON-FIELD_VALUE_EXPECTED
                          + " but is " + REASON-FIELD_VALUE_ACTUAL + "instead."
      WRITE NOTIFICATION: "Should the expected value be changed to "
                          + REASON-FIELD_VALUE_ACTUAL + "?"
    WHEN …                                                     924
      …
  ENDCASE.

WHILE DEV_PROVIDED_FEEDBACK.
    "Wait.
  ENDWHILE.

IF DEV_PROVIDED_FEEDBACK = YES.
    ADJUST_ASSERT.
940   WRITE NOTIFICATION: "Assertion adjusted."
    REURN TRUE.
  ELSE.
    WRITE NOTIFICATION: "Adjust your changes to the productive code, please."
    RETURN FALSE.
  ENDIF.
ENDLOOP.
```

1010 "The old source code snipped, to be replaced, is directly retrieved from the source code of the unit test.
SOURCE_CODE->GET_SOURCE_CODE_OF_UNIT_TEST( FAILED_TEST ).

OLD = "lt_exp_message = VALUE #( ( msgid = 'ABC'
                                  msgno = '011'
                                  msgty = warning ) )."                    ↙ 1030

"The new source code snipped, replacing the old one is derived from the actual value from the result of the unit
test. Simple code generation techniques can be used here.

NEW = "lt_exp_message = VALUE #( ( msgid = 'ABC'
                                  msgno = '011'
                                  msgty = warning )
                                ( msgid = 'ABC'
                                  msgno = '015'
                                  msgty = warning ) )."                    ↙ 1032

SOURCE_CODE->REPLACE_STRING(OLD, NEW).
                    ↙ 1040

FIG. 10

EVALUATION AND UPDATE OF TEST CODE WITH RESPECT TO PRODUCTION CODE CHANGES

FIELD

The present disclosure generally relates to testing of computer program code. Particular implementations provide automated or semi-automated evaluation of test code with respect to changes made to code tested by the test code.

BACKGROUND

Determining and correcting the source of software errors or performance issues, commonly referred to as debugging, remains a major problem in software development. Several studies have estimated that debugging consumes over fifty percent of software development time and costs. Although software configuration management systems and formalized debugging approaches can assist in debugging efforts, debugging can remain a tedious, time consuming task.

In order to try and reduce bugs in released software code, software development processes typically include the development of various tests for code under development. Once test code is defined, it can be periodically executed against code being developed, which can be referred to as target code, production code, or tested code.

In some cases, the volume, and potentially complexity, of test code exceeds, including potentially by orders of magnitude, that of the target code. When target code is changed, it can affect one or more tests written for that target code. Finding test code that is affected by a change to target code can be time consuming, as can updating the test code to account for the changes to the target code. This problem can be compounded when given production code is subjected to multiple tests. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for automatically updating test code based on changes, including additions or deletions, to production code. Requests to analyze production code and a modification to production code are received. The modification is applied to the production code to provide modified production code. Test code specific for the production code is executed on the modified production code. It is determined that a test specified in the test code was failed by the modified production code. A condition responsible for test failure is identified, where the condition specifies at least one expected value or at least one expected result. A modification to update the test code is determined, where the modification includes an actual value or an actual result obtained during execution of the failed test. The modification to the test code is applied to provide modified test code.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 1 presents example original software code containing indicators for test code and a test version of the original software code with automatically inserted test code at activated indicators.

FIG. 6 is pseudocode representing example production code used in describing how disclosed technologies can be implemented.

FIG. 7 is pseudocode representing example test code to be used with the example production code of FIG. 6.

FIG. 8 is example pseudocode that can be used in automatically evaluating the test code of FIG. 7.

FIG. 9 is example pseudocode that can be used in notifying a user of proposed modifications to test code in response to execution of the pseudocode of FIG. 8.

FIG. 10 is example pseudocode that can be used in updating test code with a proposed modification of FIG. 9.

DETAILED DESCRIPTION

Example 1—Overview

Figure 2:
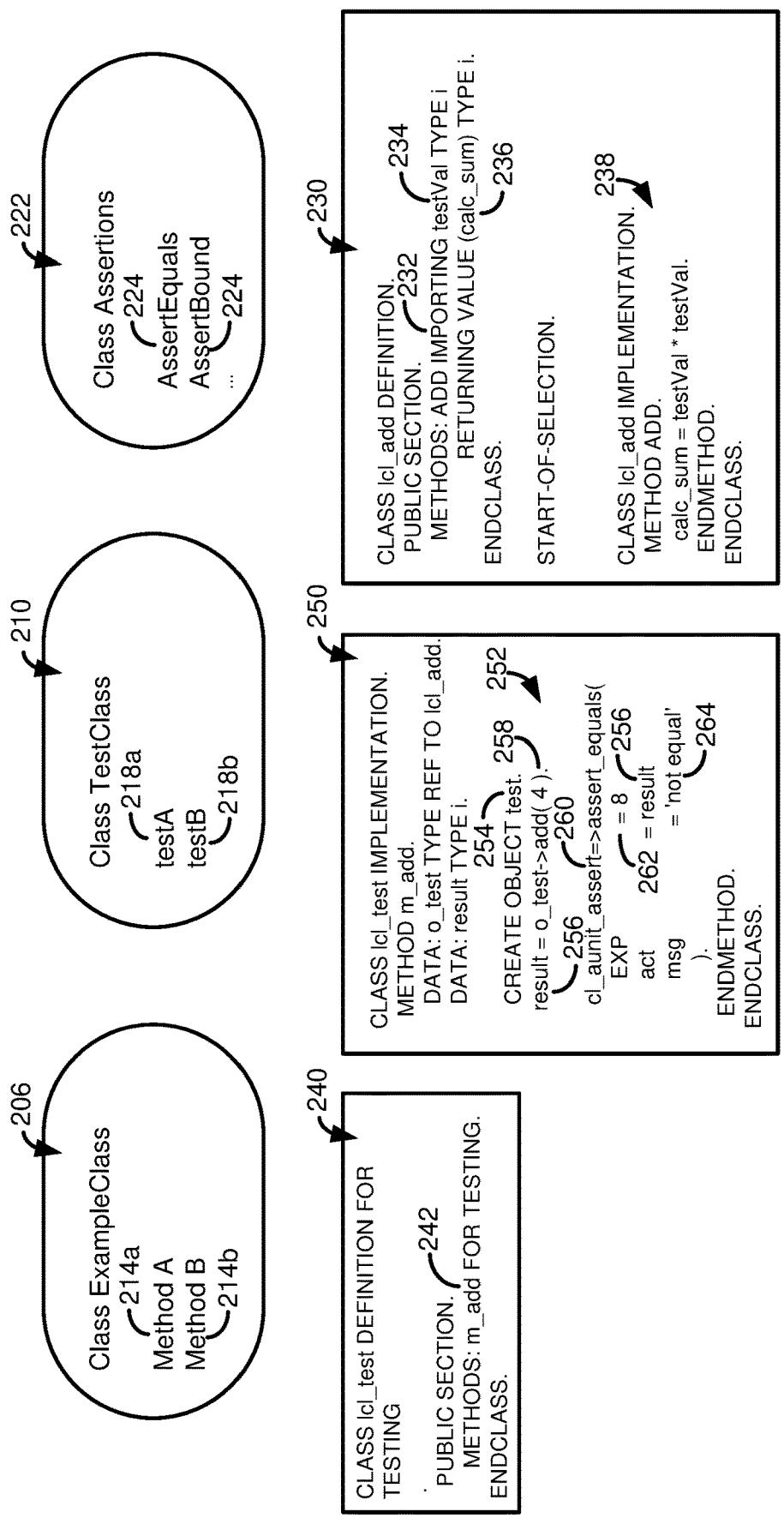
FIG. 2 is a diagram illustrating how a test class can call an assertion method of an assertion class in order to carry out tests for class target code, and example definitions and implementations for a test class and an example implementation of class target code.

Determining and correcting the source of software errors or performance issues, commonly referred to as debugging, remains a major problem in software development. Several studies have estimated that debugging consumes over fifty percent of software development time and costs. Although software configuration management systems and formalized debugging approaches can assist in debugging efforts, debugging can remain a tedious, time consuming task.

In order to try and reduce bugs in released software code, software development processes typically include the development of various tests for code under development. Once test code is defined, it can be periodically executed against code being developed, which can be referred to as target code, production code, or tested code.

In some cases, the volume, and potentially complexity, of test code exceeds, including potentially by orders of magnitude, that of the target code. In one particular software design paradigm, tests for target code are written before the actual target code itself. In at least some cases, particular test code is written to test a particular aspect or use case of the test code. For instance, a method or function may be called by multiple different processes or use scenarios of a software application. The input, processing of the input, or output can change depending on the particular process or scenario. In order to isolate potential problems with the target code, different test code may be written for different processes or scenarios. Similarly, it is often desirable to write tests in a way such that a single aspect of the target code is being tested by each test, which can help isolate the source of a bug.

As an example, consider production code that performs processing on four input parameters and produces a single output parameter. At least four separate tests may be desirable—one for each of the input parameters, where one input parameter can be tested (e.g., by providing different values for the input parameter during the testing) and the output can be compared with an expected output. The other three input parameters can have fixed values, and thus the behavior of the production code, such as providing or deviating from the expected output, can be attributed to the input parameter under test.

Multiple tests for the same input parameter may be desirable, such as having different tests for different application processes or use scenarios. Input parameters may influence one another, and thus it may be desirable to have tests where two input parameters are allowed to vary (e.g., by providing different sets of input for the two input parameters), and the other two parameters are kept constant (or otherwise provided with values that provide a desired or expected behavior). It can be seen that even for relatively simple production code the length and complexity of test code can be much greater than the production code being tested.

When target code is changed, it can affect one or more tests written for that target code. Finding test code that is affected by a change to target code can be time consuming, as can updating the test code to account for the changes to the target code. This problem can be compounded when given target code is subjected to multiple tests.

As an example, consider production code that generates possible messages, which can be messages displayed to a user, error codes, etc. Test code may be written that checks to make sure one or more messages are produced by the testing, or that a message produced in testing is in a list of expected messages. The production code is modified in a way that a new message is produced—a message that was not included in the test code. Several issues can arise. One issue is that, if the test code is not modified, the tests may fail even though the production code is operating as intended. However, it can be difficult to identify in advance (before modifying the target code) the test code that needs to be adjusted—particularly if a software developer is not familiar with/did not write the test code or the test code is not well documented. Even once the relevant test code is identified, the test code must typically be manually updated by the developer.

This scenario illustrates the earlier observation of how a large percentage of software development cost and effort is related to testing/bug correction. However, such testing may be very important, as releasing software that does not operate correctly can have serious consequences—consider software that is used in areas such as transportation, medical care, or banking. Accordingly, room for improvement exists.

As used herein, a bug, also referred to as a coding error or software defect or fault, refers to code behavior that produces unintended or undesirable behavior. Bugs can result from failure to follow the correct syntax of a programming language. Bugs can also result from improper code semantics or code design, such as mathematical operator errors (e.g., division by zero), variables that may go out of bounds (e.g., a variable that causes an array to go out of bounds), memory leaks, security flaws, or bugs that result from improper interaction of software modules or components. Categories of bugs can include arithmetic errors, logic errors, syntax errors, resource errors, threading errors, interface errors, or errors resulting from the interaction of different programmers. Bugs can be associated with these and other types. In some cases, error messages or codes, including error messages from exception handling routines, can provide an indication of a bug, including its type and possible information as to its cause.

Typically, software developers test code at various stages of development. Testing code can involve more than simply executing code and looking for errors. For example, in many cases, software development occurs in a componentized or modular fashion. Different developers, or development teams, may be working on different parts of a larger program, or various components may be in different stages of development. If the components interact, it can be difficult to test a component whose operation depends on one or more other components that are not available, not fully developed, or are not suitably tested and debugged (which may, for example, make it more difficult to determine which component contains a bug).

One way to deal with the issue of incomplete or unavailable components, or to isolate tests to a single functional software code unit, is to hard code values (e.g., input values, which can be actual parameters or arguments) that may be externally supplied during "normal" software execution, such as values provided by user input, values from another data source (e.g., a database system that may not be available during testing), or values that may be returned by other components (e.g., return values from calling a function or method, or provided in response to an API call or similar mechanism, which values can be associated with an interdependent code unit—hard coding isolates the software unit being tested from another software unit that, during runtime, would supply input values). In some cases, rather than hard coding values, a developer may wish to replace or disable certain code sections that might be desired in the final version of the code, but which should not be run during testing.

When debugging, it can sometimes be difficult to determine if code is functioning properly. Even if an error is detected, it can be difficult to determine the source of an error. In some cases, it can be useful to output information, such as variable values, during program execution that is different than (or in addition to) any output that might be provided during normal program execution. A developer can manually cause such values to be checked or displayed (e.g., using cout statements in C++). Again, however, this process can be time consuming and can result in code that is more cluttered, complex, and difficult to read. When checks are performed, such as on variables, the nature of the check can vary over time, which may cause the check to be rewritten or edited, further increasing development time and costs.

The present disclosure provides techniques that assist in updating test code based on changes to target code. In one aspect, the present disclosure provides techniques that identify test code that may need to be updated based on a change to target code. For example, test code can be executed on changed target code and failed tests can be flagged for possible adjustment. In another aspect, the present disclosure provides techniques that can assist in updating test code that is affected by a change to target code. For example, a deviation from expected behavior can be used to suggest how test code may be altered to conform with a change to target code.

A developer may wish to avoid updating actual target code until test code has been adjusted to account for a planned change to the target code. In one aspect, the present disclosure provides for making a copy of at least a portion of target code that includes a modification to the target code. Test code and test code modifications can be executed against the target code copy—simulating the effect of a change to test/target code. In some cases, changes to test code can also be made to a copy of the test code. Once the operation of test/target code has been confirmed, such as by a developer, the changes to the target code/changes to test code can be made to the original target/test code.

In some cases, suggested changes to test code can be automatically identified and applied. However, typically a developer will wish to manually confirm appropriate behavior of both modified target code and modified test code before committing the changes. Thus, disclosed embodiments can provide a developer with a summary of suggested changes to be made to test code to accommodate a change to target code. The developer can choose to have some or all of the changes applied to the test code automatically (or the developer can manually make the changes, in another implementation). Optionally, the developer can opt to re-execute the altered test code to confirm the test code executes as desired before committing the changes to the test code or to the target code.

In the example above of production software without four input variables, using disclosed technologies, test code can be executed against the modified production code. A disclosed innovation, implemented in software, can identify one or more tests that failed. For example, the failed tests may indicate that a message is included in an output file that is not an expected output. Even this information can save a developer valuable time.

Software-implemented aspects of the present disclosure can then identify the source of the failure and suggest a modification to the test code to address this failure. In the example, the message that was not found in the list can be the source of the failure, and an adjustment to the test code can be to include the missing message in the list of expected messages. This change can be made automatically, or it can be suggested to a developer and the developer can choose to have the change made automatically, can make the change manually, or the developer can choose to reject the suggestion. Optionally, the test code can be re-executed to confirm that the test code now acts as expected. As additional changes are made to the production code, the developer can have some confidence that any new test failure is not due to prior code changes. Similarly, even when evaluating the original production code changes, the disclosed techniques help the developer ensure that any test code failures are due to actual errors/issues with the production code rather than resulting from test code that has not been updated to account for "legitimate" changes to production code behavior.

Examples 2-4 describes various ways in which target code can be tested, including having target and test code features implemented as classes. Although described techniques can be used with separate test code, they can also be used when test code is embedded within target code. For example, assertions can be included in test code that is applied to target code, or can be included in the target code itself, including when target code is rewritten or modified for testing purposes. Examples 5-8 provide details regarding disclosed techniques for evaluating test code.

Example 2—Example Features to Facilitate Code Testing

FIG. 1 provides an example original code segment 100, representing production code, such as production code being developed, and an example test code segment 102, such as test code that is at least partially automatically generated from the original code segment 100. The test code segment 102 can be generated from the original code segment 100 using one or more of the techniques disclosed in this Example 2. Further details of these techniques can be found in U.S. Pat. No. 10,496,379, which is incorporated by reference herein in its entirety.

The original source code segment 100 represents a portion of code for a method 110, such as a method to search for available economy class seats on a particular flight itinerary. The code for the method 110 includes a modifiable code segment in the form of a replaceable or substitutable code segment 112, which can also be referred to as a SEAM (such as in products available from SAP SE, of Walldorf, Germany). A replaceable code segment 112 can be indicated in various ways, such as by including a statement 114 indicating a starting position for the replaceable code segment, and a statement 116 indicating an end position for the replaceable code segment. The replaceable code segment 112 can be selectively executed, replaced with other code, or simply not executed (which can be equivalent to replacing the replaceable code segment with "empty" code, or commenting out or otherwise rendering unexecutable the replaceable code segment).

The test code segment 102 includes the statements 114 and 116 indicating the replaceable code segment 112, but the code of the replaceable code segment has been replaced by substitute code 120. Substitute code 120 can be, for example, code provided by a developer in order to generate the test code segment 102. The test code 102 can be automatically generated by replacing the replaceable code segment 112 with the substitute code 120.

Original code segment 100 includes code checkpoints 124, 126, 128, which can also be referred to as SPOTs. The code checkpoints 124, 126, 128 can be indicated by a particular keyword (e.g., "TEST-SPOT") and can include one or more identifiers, such as a name of the checkpoint (e.g., "check_currency) and a variable (e.g., "ls_flight-CURRENCY"). Note that code is not otherwise associated with the checkpoints 124, 126, 128 in the original source code segment 100.

The test code segment 102 illustrates how code for checkpoints, such as checkpoints 124, 126, 128, can be added. A user interface, such as in the form of a wizard, can be provided to allow a user to select which checkpoints to use or activate, and to specify how values should be checked, such determining the status of a variable, including whether the variable has been assigned and its value relative to another value (e.g., a value supplied by the developer via the user interface). The test code 102 can be generated by automatically adding appropriate code proximate the checkpoint 124, 126, 128. For example, test code 102 shows checkpoint code 130 added after checkpoint 124, while checkpoints 126 and 128 have not been activated. Checkpoint code 130 indicates that a variable is to be checked as equal to a certain value, and an error message displayed if the variable is not equal to the value. In other cases, the test code can be manually generated in whole or part.

Both the original code segment 100 and the test code segment 102 include a modifiable code segment in the form of a redirectable method call 140, which can also be referred to as STUBs (including as implemented in products of SAP SE, of Walldorf, Germany) The redirectable method call 140 can be a method for which a substitute implementation can be created during testing, and the replaceable call can be substituted with a call to the substitute implementation. When the original code segment is deployed in a production environment, the redirectable method call 140 can be left unchanged and can call a production method.

The redirectable method call 140 can be indicated as such using a starting statement 142 and an ending statement 144. In at least some cases, the starting and ending statements 142, 144 are used to designate a redirectable method call 140. In some cases, having a commented redirectable method call in the original code segment would typically require the original code segment 100 to be changed prior to being executed in a production environment (e.g., the commenting would have to be removed to make the removable method call active). Thus, the use of the starting and ending segments 142, 144 can facilitate code testing by allowing redirectable method calls 140 to be located and handled without requiring the original code segment 100 to be modified prior to deployment.

The redirectable method call 140 can include an identifier 148, such as a name. The identifier 148 can be used to provide an option to a user to activate the redirectable method call 140 during testing, which can then be directed to call a non-production method, or not to activate the test method call, which can then be directed to call the production method during testing. A user can supply code for the non-production method. In the test code 102, the redirectable method call 140 has been changed to substitute method call 150.

In at least some aspects, the original code segment 100 and the test code segment 102 are separately maintained. That is, when testing is to be performed, the original code segment 100 is analyzed, such as to determine the presence, and, typically, identifiers, for the replaceable code segment 112, the code checkpoints 124, 126, 128, and the redirectable method call 140. For the replaceable code segment 112 and code checkpoints 124, 126, 128, if they are activated for testing, the replaceable code segment is replaced with substitute code 120, and suitable code, such as checkpoint code 130, is added for activated code checkpoints.

Thus, testing can produce the test code segment 102 such that the original code segment 100 need not be modified. Maintaining the test code segment 102 separately from the original code segment 100 can result in the original code segment being easier to read and maintain, as it does not include much of the test-specific code of the test code segment. Similarly, particularly when source code, or other human-readable code is shipped, the code can omit much of the test-specific code (or, in further cases, all test-specific code can be removed, such as by removing lines having starting and ending segments 142, 144). As the original code segment 100 typically has fewer lines than the test code segment 102, it can also be smaller (whether compiled or not) than the test code segment. In addition, having fewer lines of code, the production code can be more secure.

Example 3—Example Testing of Target Code Using Test Code Having Assertions

FIG. 2 illustrates how test classes can be used to test software components, such as classes, programs, library files, etc. In the example shown, a test class 210 is used for testing of a class 206. The class 206 is shown as having methods 214a, 214b, and the test class 210 has corresponding test methods 218a, 218b. That is, test method 218a tests the operation of method 214a, and test method 218b tests the operation of method 214b.

In some cases, testing can be facilitated by components of a software framework. For example, the ABAP programming language includes a library of test functionality, in the form of assertions that can be made for other software components. An example of this is the assertions class 222, which contains a number of assertion types 224. Assertions can be conditions that are evaluated with respect to other software, and which typically return a Boolean value depending on whether the assertion holds or not with respect to given software being evaluated. Evaluation of assertions can also return exceptions (or other types of error messages or error handling mechanism), rather than Boolean values. Or, a Boolean value (e.g., a value indicating that a desired result was not obtained) can be used to raise an exception (e.g., if return value==FALSE, then raise exception).

Assertions can be called by methods of other classes, such as by test methods 218a, 218b. At least for some types of assertions, a call to a member function of the assertions class 222 can include an actual value obtained by executing a test method 218a, 218b and an expected value. In the case of an "assert equals" assertion, a value of FALSE can be returned if the actual and expected values are not the same (which in turn can indicate that the test has failed). Various types of assertions can be analyzed using disclosed techniques, including for determining how test code might automatically be updated based on changes to target code including, without limitation:

the actual value is not equal to an initial value;
the actual value is equal to an initial value;
the actual value is equal to a specified value;
the actual value is not equal to a specified value;
the actual value is one of a plurality of specified values;
the actual value is not one of a plurality of specified values;
the actual value is within a specified range of values;
the actual value is not within a specified range of values; or
a pointer points to a value or object instance.

FIG. 2 also presents code for an example class 230, an example test class definition 240 of a test class that includes methods to test the class 230, and an example test class implementation 250 for the test class definition 240. The class 230 includes an ADD method 232, which includes an input parameter 234 (e.g., an expected argument provided when the method 232 is called), testVal, and an output parameter 236 (e.g., a value returned by the method), VALUE. While the method 232 is called ADD, and is perhaps intended to return the sum of the input parameter 234 with itself, it can be seen that the implementation 238 of the ADD method instead returns the product of the input parameter with itself. This is a kind of error that software testing could identify.

It can be seen that simply calling the method 232 may be insufficient to determine that it is operating as intended. For example, assume that a value of "3" is provided by a test. The method 232 will return a value of "9," which is not the intended result of "6." While an analysis of the testing of the class 230 might indicate 100% code coverage, since all lines of code are the class 230 are executed by the test with the value of "3," the test is not "good," since it fails to determine that the result provided by the test is not the intended result.

The test class definition 240 defines a test method 242, m_add, for testing the method 232. The test class implementation 250 contains an implementation 252 of the test method 242. The implementation 252 declares an object 254 as an instance of the class 230, and a variable 256 to hold a result of a call to the method 232 using the object 254. At line 258, the variable 256 is assigned the value of calling the ADD method 232 with a value of "4."

However, the test class implementation 250 includes an assertion 260 that calls an "assert_equals" method of a unit test class in the ABAP programming language. The assertion 260 specifies an expected value 262, the variable 256, and a message 264 to be displayed if the expected value does not equal the value of the variable 256 when the assertion is made. In this case, the test class implementation 250 would identify that the value returned by calling the method 232 with a value of "4," is not the expected value of "8," but is rather "16." The test would thus fail, indicating to a developer that the method 232 may need correction.

Figure 3:
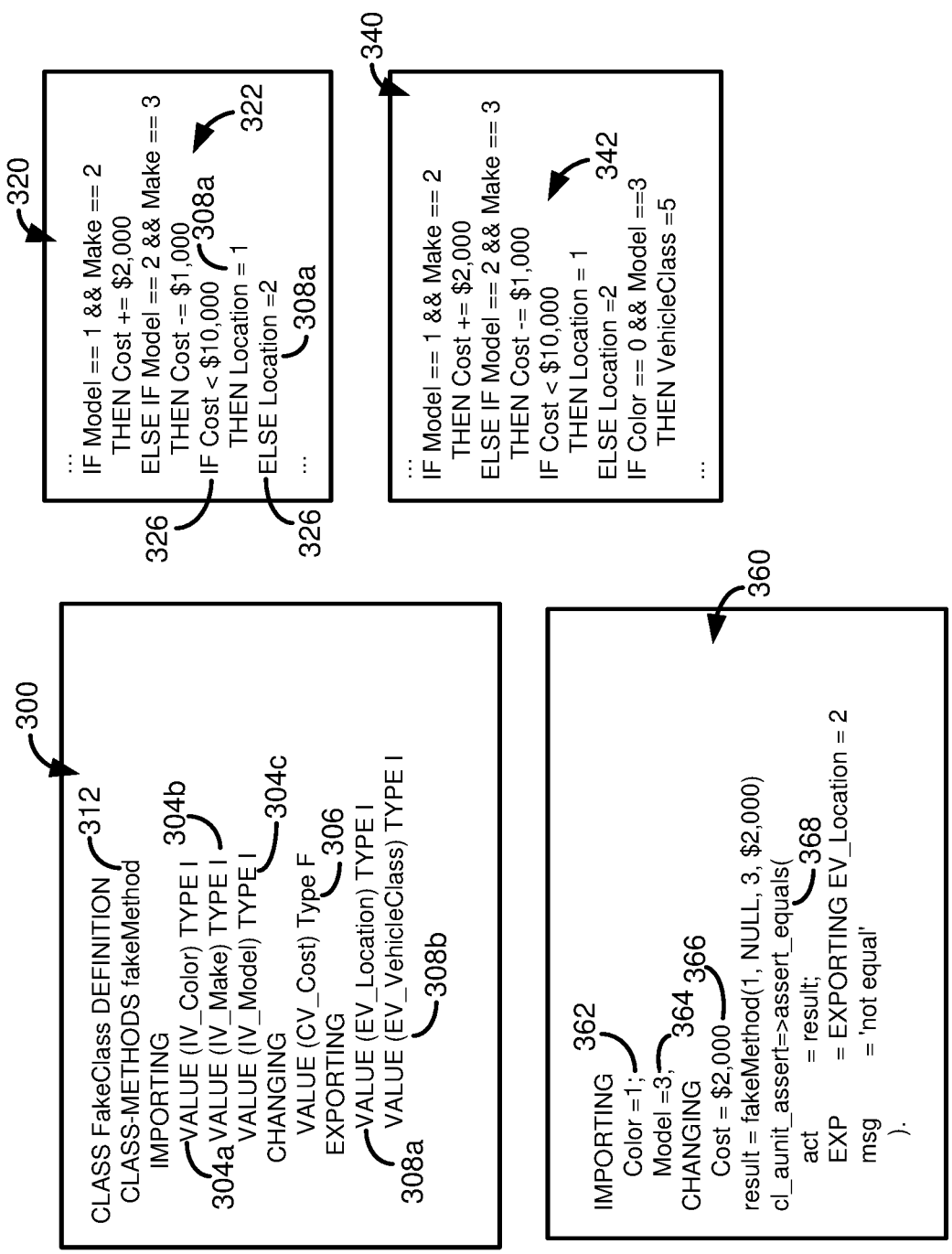
FIG. 3 provides an example class definition and two example implementations for the class, illustrating how input values can affect one or more output values.

Example 4—Class Definition and Implementations Illustrating Relationships Between Output Values and Input Values FIG. 3 provides an example class definition 300 that indicates how a software component, such as a method of a class, can have multiple parameters of multiple types. Parameters can have different types. Parameters can include input parameters, which are values or references to values (e.g., a reference to a variable) that are provided to a software component, and which the software component may use during execution, including to influence the value of other variables or actions that the software will perform. The value of an input parameter is not changed outside of the scope of the software component. For example, a value of a variable in code that calls the software component may be used by the called software, and may be altered locally within the called software component, but the value of the variable is not changed in the calling code. In some cases, fixed values can be provided as input parameters, or values of a variable can be passed by value. Values of variables can also be passed by reference, but are designated as not changing the value (e.g., "constant") of the variable in the scope of the calling code.

Another type of parameter is an export parameter, which can be a parameter of a software component or a return value provided by the software component. Although an export parameter may assign a value to a variable, such as a variable passed by reference as a parameter, a software component does not use a current value of the export parameter in the scope of the calling code. Some parameters can have values that are both used and modified by a software component, and can be referred to a "changing" parameter or an input/output parameter. Changing parameters can be equivalent to passing a variable by value or reference to a software component without an indication that the variable cannot be modified. As used herein, "input value" refers to a value that is provided to a software component for manipulation, such as an input parameter or a changing parameter. An "output value" refers to a value that is changed by a software component and returned to a caller (or otherwise used in another software component), such as an output parameter or a changing parameter.

In one aspect, software testing, such as using assertions or equivalent functionality, is used to determine whether input or changing parameters have an expected effect on an export or changing parameter.

The definition 300 includes examples of input parameters 304 (shown as 304a-304c), a changing parameter 306, and export parameters 308 (shown as 308a, 308b). The parameters 304, 306, 308 are used with a method 312. Code 322 that is part of a first implementation 320 of the method 312 may represent a portion of a larger code section of the implementation 320. The code 322 includes the "location" export parameter 308a. The code 322 can be analyzed to determine what affects the final value assigned to the export parameter 308a. It can be seen that conditional operations 326 assign a value to "location" based on a value of the changing parameter 306, "cost." In turn, it can be seen that the value of "cost" is determined using the "make" input parameter 304b and the "model" input parameter 304c. Thus, "cost," "make," and "model" can be said to influence the final value of "location."

Code 322 also modifies a value (e.g., an input value) for the "cost" changing parameter 306. As described, cost 306 is modified by the input parameters 304b, 304c. So, input parameters 304b, 304c can be said to influence the final value of "cost." In the code 322, the input parameter 304a, "color," does not affect a value of "cost" or a value of "location."

Code 342 is associated with a second implementation 340 of the method 312 and can be analyzed in a similar manner as the code 322. In the code 342, it can be seen that input parameter 304a and input parameter 304c influence the value of the export parameter 308b, "VehicleClass."

Example 5—Example Process for Assisted Modification of Test Code

Figure 4:
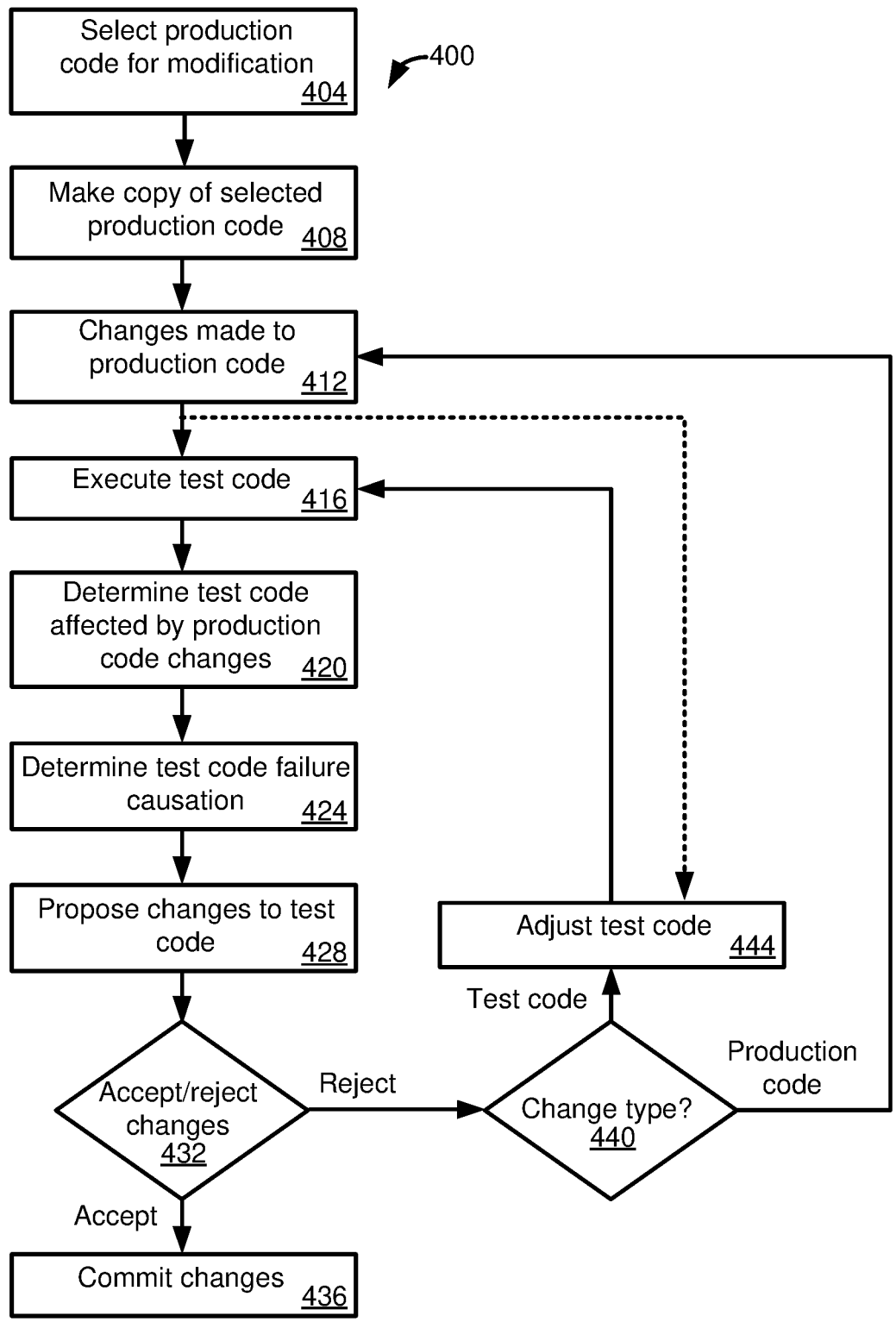
FIG. 4 is a flowchart of an example method of automatically adjusting test code to account for modifications to production code.

FIG. 4 is a flowchart of a method 400 that assists in updating production code and associated test code. It should be appreciated that while all of the steps of the method 400 can be carried out, some steps can be omitted and the method still provides valuable advantages, as will be further discussed.

At 404, a developer selects (or has selected for them) production code for modification. The production code can be a file, such as a file representing all or a portion of a software program. For instance, the file can be a header file or an implementation file for a class definition or other software object/abstract data type. Or, the file can be a main program or a file that represents a particular routine that can be called by a main program (such as a library file).

A copy of all or a portion of the production code is made at 408. The copy can be in the form of a file having a file name different that than the source file having the selected production code or can be maintained in memory. The developer makes changes to the copy of the production code at 412, or the changes can be made in an automated or semi-automated manner (e.g., the developer can specify a find/replace, a find/add, or a find/delete operation, or software corrections specific in an update file can be applied, including, without limitation, a "note" as implemented in software available from SAP SE, of Walldorf, Germany) In other implementations, step 408 is omitted, and changes are made to the original production code at 412, although such changes may be discarded if not specifically saved/committed by a user or process.

All or a portion of test code relevant to the modified production code is executed at 416. The test code can be in the form of unit tests, including as implemented in software available from SAP SE, of Walldorf, Germany Test code affected by the changes to production code is determined at 420. At least in some cases, the test code was known to execute successfully against the production code prior to the modifications made at 412. Thus, if any of the tests implemented in the test code fail when the test code is executed at 416, it can be assumed at 420 that the failure is due to one or both of errors in the changes to the production code or errors in the test code (where the error can be that the test code fails to account for changes to the production code). In some cases, the changes to the production can be simple enough such that it can be safely assumed that failed tests are due to the test code not being updated to account for changes to the production code. So, 420 can include identifying failed tests.

At 424, it is determined why tests of the test code failed. In some cases, this information can be obtained from a test itself. That is, the test code itself may have error logging/reporting functionality which can be leveraged by software carrying out the method 400. In other cases, software carrying out the method 400 can be programmed to identify one or more reasons for test failure. In either event, one way of determining a reason for test code failure can be that one or more executed results of test code were not satisfied by actual execution results. For example, particular test code may produce four expected outputs. If three actual outputs matched the expected outputs, but one actual output value did not match the corresponding expected output value for an output parameter, that output parameter can be identified as a reason for test failure. More particularly, it can be identified that the failure with respect to that output was due to the actual output value (say "X") not matching the expected value (for example, "Y," or of "X" not being in a list of acceptable output values).

Changes can be proposed to test code at 428, such as based on the reasons for test code failure identified at 424. For instance, in the example above, the proposed change can be to change the expected output to "X," or adding "X" to a list of expected outputs. The changes can be accepted or rejected, such as by a developer, at 432. In some cases, if the changes are accepted, they are saved or committed at 436, where the saved changes are typically both for the production code and the test code, however optionally only one set of code changes is saved at 436. Saving the changes can include saving a temporary file using the name of an original file or replacing code in an original file with changed code.

After 436, the method 400 can end, or it can loop to 404 where different production code is selected for modification, which can be in the same code (e.g., file) as the previously changed code in some cases. For example, if multiple changes to a single set of production code are desired, the method 400 can be performed after less than all of the changes are made, which can help identify changes to test code that might be needed and help to isolate needed changes to test code as opposed to test code failures that might be due to erroneous production code changes or incompatibilities between production code changes. In other words, this incremental approach can help allow test code to be developed in a "normal" manner of helping to identify issues with production code. In other cases, the next production code can be different code than previously tested (e.g., code in a different file). In some cases, the code in a different file can optionally interact with code in a file with code previously analyzed using the method 400, such as where the newly selected production code calls, or is called by, the previously analyzed code, or where the files have a header/implementation relationship.

Returning to 432, if the changes are rejected, it can be determined at 440 whether the developer wishes to modify the production code or the test code. A rejection to production code may be made, for example, if a user determines that the reason for test code failure was not due to a problem with the test code, but rather with the production code. A rejection to test code changes may be made, for example, if it is determined that the test code change does not, or does not by itself, resolve failure of the relevant test. In some cases, an option can be provided to accept suggested changes to test code but to then, such as manually, make further changes to the test or production code.

If it is determined at 440 that changes to test code are being rejected, the method 400 can proceed to 444 where the test code is further adjusted or modified, which can be in place of or in addition to changes suggested at 428. The method 400 can then return to 416 where the modified test code is re-executed on the modified production code.

If it is determined at 440 that changes to the production code are being rejected, the method 400 can return to 412, where different or additional changes can be made to the production code by the developer. It could be that both the test code and the production code are to be further modified. FIG. 4 illustrates this possibility with the dashed line shown, where the test code is modified after additional modifications are made to the production code by the developer. Alternatively, changes could be made to the test code followed by the developer making changes to the production code.

Example 6—Example Computing Environment for Evaluating Test Code

Figure 5:
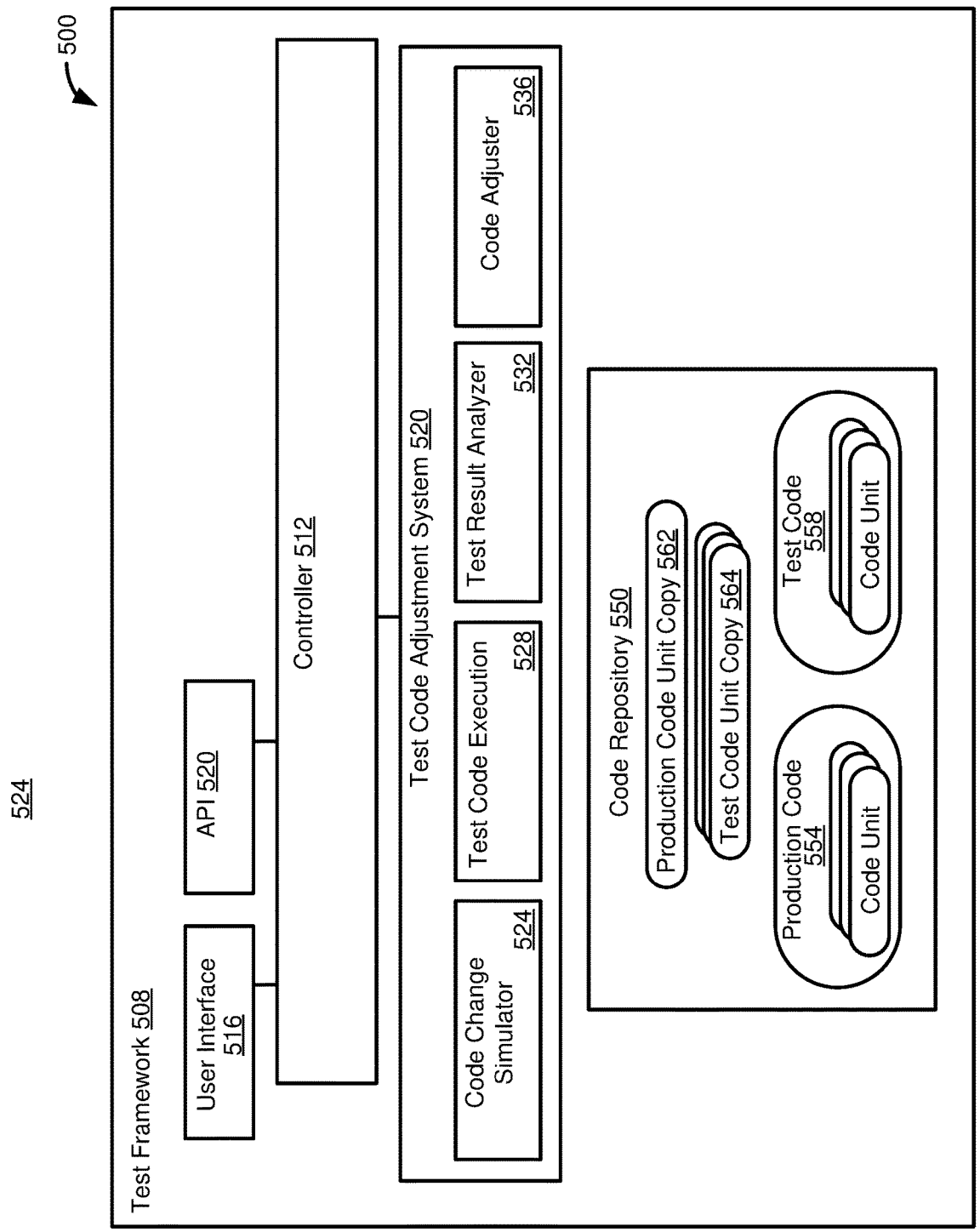
FIG. 5 is a block diagram of an example computing environment in which disclosed technologies can be implemented.

FIG. 5 illustrates a computing environment 500 in which disclosed technologies can be implemented. The computing environment 500 includes a test framework 508. The test framework can perform functions for creating tests, executing tests, analyzing test results, and providing test results. In a particular example, the test framework 508 can be the ABAP Test Cockpit of SAP SE, of Walldorf, Germany. More generally, the test framework 508 can be part of, or accessible by, a software development tool, such as an integrated development environment (IDE).

The test framework 508 includes a controller 512. The controller 512 can be responsible for carrying out, including coordinating, various operations regarding changes to production or test code, including the method 400 of FIG. 4 or the method 1100 of FIG. 11.

The controller 512 can communicate with a number of components, including a user interface 516 and an application program interface 520. The user interface 516 can allow a user to perform various actions, such as selecting production code to be modified, defining or modifying test code or production code, updating or evaluating test code based on changes to production code, receiving information regarding test results, or accepting or rejecting changes to test or production code. The application program interface 520 can facilitate the performance of similar processes as the user interface 516, but with respect to various applications (which can be part of the test framework 508 or external to the test framework), including in response to user input received using user interfaces associated with such applications.

The controller 512 communicates with (or in some cases includes) a test adjustment system 520. The test adjustment system 520 can include software components (which can be implemented, for example, as discrete operational units, such as classes, that are coordinated by a central program acting as the test adjustment system) that implement disclosed technologies, such as carrying out all or a portion of the method 400 of FIG. 4 or the method 1100 of FIG. 11. More specifically, the test adjustment system 520 can include a code change simulator 524, a test code execution component 528, a test result analyzer 532, and a code adjuster 536. Although shown as separate components, two or more of the components 524, 528, 532, 536 can be combined, or functionality of the disclosed innovations can otherwise be implemented in a different manner.

The code change simulator 524 can make copies of code, such as production or test code. For example, in response to user input, such as through the user interface 516, the code change simulator 524 can make a copy of selected production code. The code change simulator 524 can also make copies of test code relevant to selected production code. In particular, the code change simulator 524 can make copies of test code identified as relevant to changed production code, such as making a copy of test code for tests which were identified as failing in response to changed production code, or test code updated to account for changes to the production code (such as to have the test code perform properly with the updated production code).

The test code execution component 528 can execute test code associated with the modified production code. The execution can be in response to user input received through the user interface 516. The user can, in some cases, select to execute test code once they have made desired changes to production code.

Test execution results are analyzed by the test result analyzer 532. The test result analyzer 532 can determine what tests failed, why the test failed, and in at least some cases can also suggest revisions to test code. If a user chooses to accept changes to test code, or manually makes changes, the changes can be implemented in the test code by the code adjuster 536. The code adjuster 536 can also commit changes made to the production code, such as in response to user input through the user interface 516 indicating that the user is satisfied with the changed production code, and typically also any revised test code.

In carrying out disclosed innovations, the test code adjustment system 520, or its components 524, 528, 532, 536, can read information from, and write information to, a code repository 550. The code repository 550 can include production code 554 and test code 558, which can be read by the code change simulator 524 and written to by the code adjuster 536, for example. In at least some cases, the code repository 550 can also store copies of production code 562 and test code 564, such as copies made by the code change simulator 524, or modifications made by the test result analyzer 532.

Example 7—Example Test Code Evaluation Techniques

FIGS. 6-10 provide pseudocode for example production and test code that can be processed using disclosed techniques, as well as pseudocode that can implement such processing. FIG. 6 illustrates example production pseudocode 600 that originally provided warning messages at lines 610, 612 depending on whether or not a condition at line 614 holds. As indicated in the pseudocode 600 at 620, a new "IF" statement 624 results in a warning message 628 being generated if the statement evaluates to "TRUE."

FIG. 7 illustrates test pseudocode 700 providing test code representing a simple test for the pseudocode 600. It should be appreciated that the pseudocode 600, the changes to the pseudocode 600, and the test pseudocode 700 are comparatively simple for the purpose of illustrating disclosed techniques, and that in practice actual test production code and test code can be much more complex, and multiple sets of test code/tests may be present for a given set (e.g., file or object) of production code.

In any event, the test pseudocode 700 include input data 704 that will be provided to the production pseudocode 600 when the test pseudocode is executed, such as indicated at 708. 708 also indicates that the output of calling the production pseudocode 600 is a message 712. At 716, the test pseudocode 700 checks to see if the message 712 is in a list 720 of expected messages.

It can be seen from the production pseudocode 600 and the test pseudocode 700 that the message 628 added to the production pseudocode is not in the list 720. Thus, check 716 will evaluate to "FALSE," indicating that the test has failed, even though the production pseudocode 600 does not contain an error (at least for the specific code being discussed). The failure of the test provided by the test pseudocode 700 can be used to identify that the test pseudocode may need to be updated in view of the changes to the production pseudocode 600, the reason for test failure (the error message 628 is not in the list 720), and a possible solution (adding the error message 628 to the list 720).

FIG. 8 provides pseudocode 800 that carries out functions of the code change simulator 524, the code execution component 528, and the code adjuster 536. At 804, the test pseudocode 700, without the changes, is executed and the "UNIT_TEST_OK" variable is assigned "TRUE" or "FALSE" depending on whether the test succeeded or failed. If the test failed, an indication is provided that test has failed and it, or the production code, should be corrected before any further changes to the test or production code are made.

At 820, if/when the test code executes successfully, a copy of the production code to be modified is made. Optionally, relevant test code is also copied. Once a developer is finished entering changes, the test code is reexecuted at 824. At 828, a notification of failed tests is provided, and a test failure analysis and adjustment routine is called at 832. Note that in at least some cases it can be expected that test code will fail if changes are made to production code, as that can indicate robust test code. The pseudocode 800 can then loop, with adjustments being made to test code, automatically, manually, or the combination of the two, until the test code does not fail when executed at 824.

If the test code did not fail at 824, an indication of test success is provided at 836, along with an indication that a developer may wish to review the test code to confirm whether it is of sufficient quality/robustness.

Once the test code passes after adjustment, or if the test code did not initially fail at 824, the copied production code or test code can be copied over the original code, committing the changes.

FIG. 9 provides pseudocode 900 for the test analysis and adjustment routine called at 832. The pseudocode contains case statements for a case 910 where an assertion (e.g., a test to determine whether a particular variable has a particular value/satisfies a particular condition) is that a tested value is equal to an initial value, a case 912 where an assertion is that a variable does not have an initial value, and a case 914 where an assertion is that a variable has a specified value (which can be a value in a list of acceptable values). For each of the cases 910, 912, 914, a message can be provided with a suggested solution to the error. For the case 910 where a value was expected to be initial, a message 920 can suggest that the assertion be removed. For the cases 912, 914, corresponding messages 922, 924 can suggest that the expected value be set to the actual value observed during test code execution. A user can choose to accept or reject these changes. If the developer chooses to have the test code adjusted, a code adjustment routine can be called at 940.

FIG. 10 presents pseudocode 1000 that illustrates how a test adjustment feature, such as used by the code adjustment routine called at 1040, can be implemented. The pseudocode 1000 calls a routine 1010 that gets the test code to be modified. The routine 1010 can, for example, use string matching to identify a relevant portion of the source code, such as searching for keywords for the condition that evaluated to "FALSE," including using terms setting forth the condition (e.g., "ASSERT" as in the ABAP programming language), condition type (e.g., "equals," "is not equal to," "is initial," "is not initial"), and a value associated with the condition (e.g., an expected value associated with the condition), if relevant. Tokens associated with the relevant programming language can be used to help parse the test code, such as identifying the start of a condition, the end of a condition, and delimiting various parts of the condition.

In a similar manner, string manipulation functions can be used to replace the relevant portion of the test code, including changing the nature of the condition or changing an expected value of the condition. In particular, FIG. 10 illustrates that original test code to be replaced 1030 is assigned to an "OLD" variable and modified test code 1032 is assigned to a "NEW" variable, and then a replacement function 1040 replaces the "OLD" test code with the "NEW" test code in the actual test code (or a copy thereof).

In the particular example shown, it can be seen how the original test code 1030 did not include a warning for a "msgno" value of "015," which is added by the modified test code 1032.

Example 8—Example Test Code Evaluation Techniques

Figure 11:
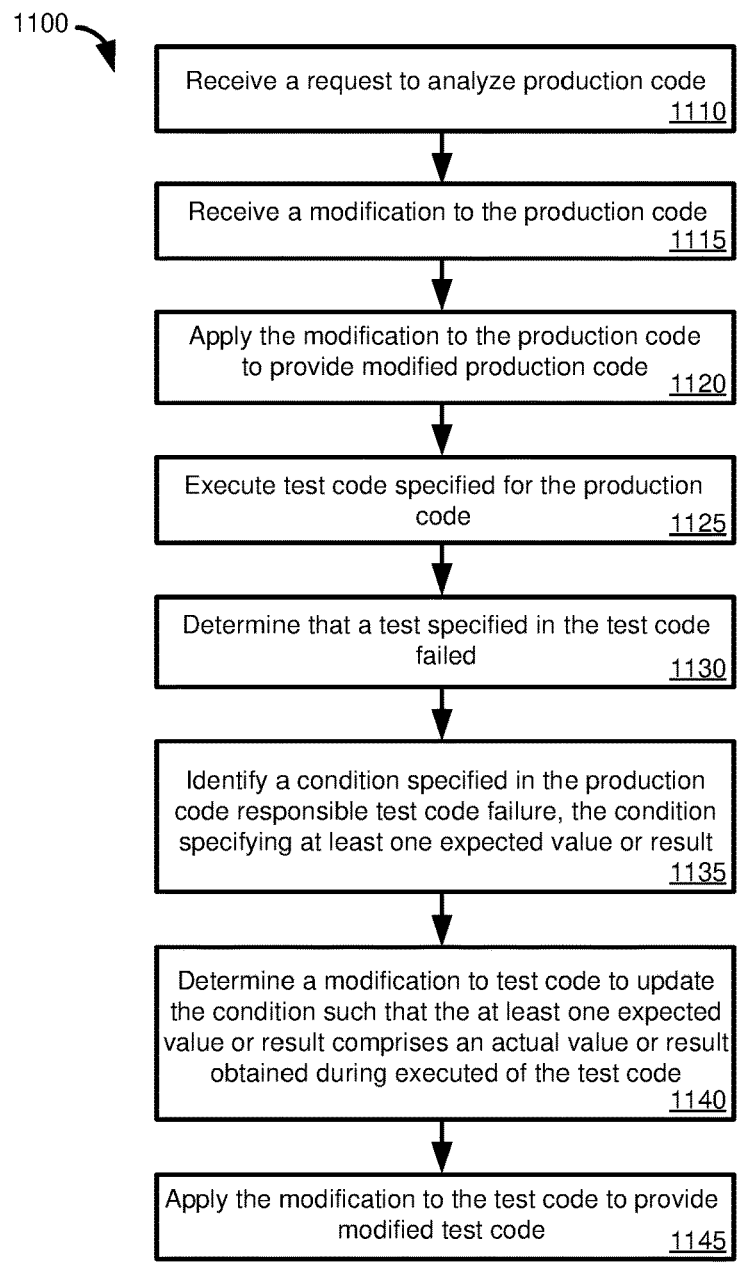
FIG. 11 is a flowchart of example operations in a disclosed embodiment of updating test code based on changes to production code.

FIG. 11 is a flowchart of a method 1000 for analyzing test code in view of changes to production code. The method can be performed, for example, in the computing system of 500 of FIG. 5, and can incorporate features discussed in conjunction with the method 400 of FIG. 4.

At 1110, a request to analyze production code is received. A modification to the production code is received at 1115. The modification is applied to the production code at 1120 to provide modified production code.

At 1125, test code specified for the production code is executed on the modified production code. It is determined at 1130 that a test specified in the test code failed. A condition in the production code responsible for test code failure is determined at 1135, where the condition specifies at least one expected value or at least one expected result.

At 1140, a modification is determined to the test code to update the condition such that the at least one expected value or the at least one expected result includes an actual value or an actual result obtained during execution of the test code. The modification is applied to the test code at 1145 to provide modified test code.

Example 9—Computing Systems

Figure 12:
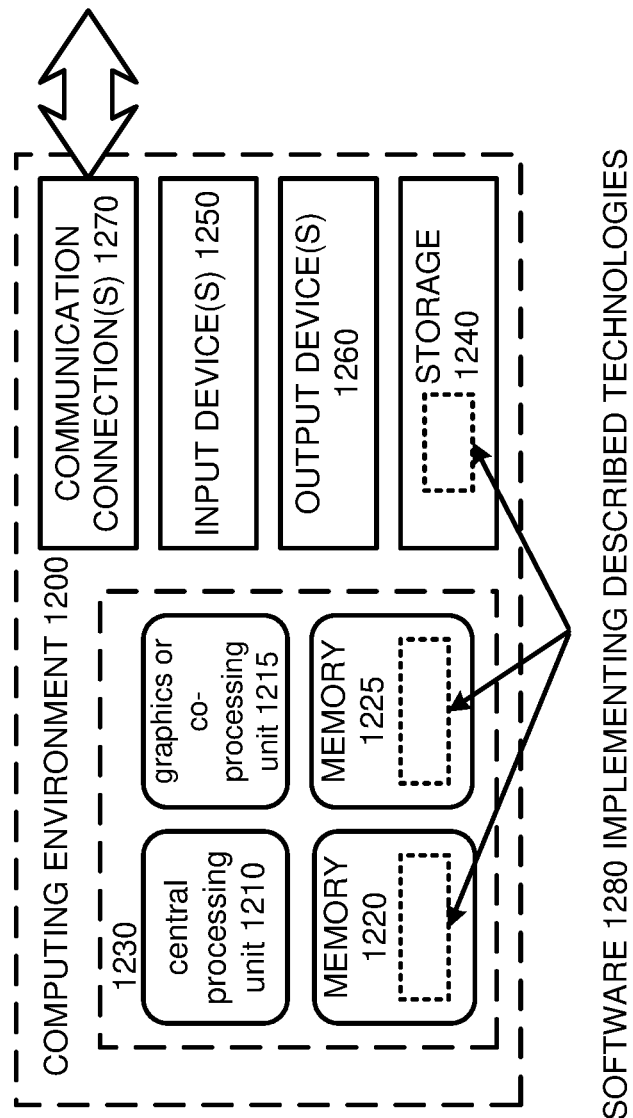
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing components of the architecture 500 of FIG. 5, including as further described in Examples 1-8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way, and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 13:
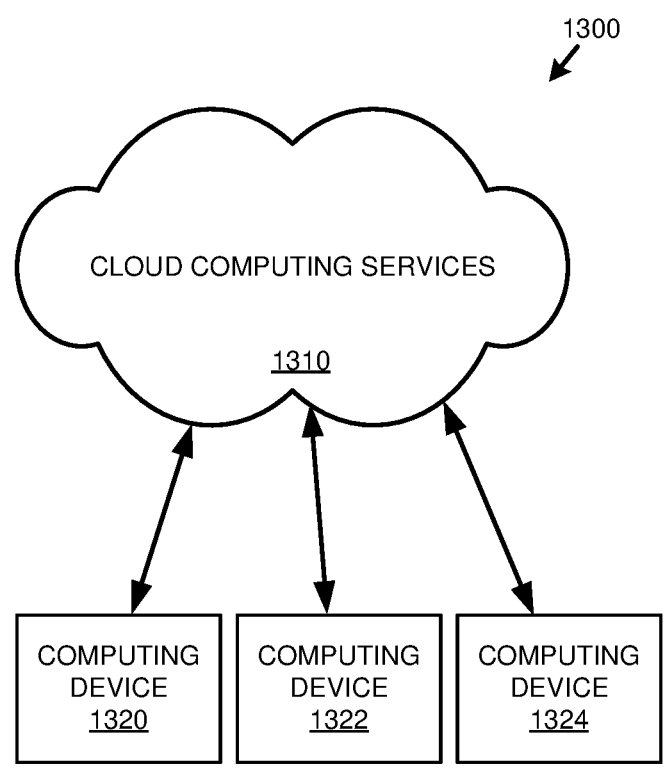
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
  memory;
  one or more processing units coupled to the memory; and one or more computer readable storage media storing computer-executable instructions that, when executed, cause the computing system to perform operations comprising:

receiving user input defining a first version of test code;

receiving a request to analyze a first version of production code, the first version of test code being specified for the first version of production code, the first version of test code comprising one or more input values to be processed by the first version of production code to provide one or more output values or results;

receiving a modification to the first version of production code;

applying the modification to the first version of production code to provide modified production code;

executing the first version of test code specified for the first version of production code on the modified production code using the one or more input values of the first version of test code to provide a first output value or a first result;

by executing the computer-executable instructions, determining that a first test of a plurality of tests specified in the first version of test code was failed by the modified production code;

by executing the computer-executable instructions, identifying a condition specified in the first version of test code responsible for test code failure, the condition specifying at least one expected value or at least one expected result, the at least one expected value or at least one expected result corresponding to an output value or result of the one or more output values or results of processing at least a portion of one or more input values of the first version of test code by the modified production code;

by executing the computer-executable instructions, determining a modification to the first version of test code to update the condition such that the at least one expected value or the at least one expected result comprises, respectively, the first output value or the first result generated during execution of the first version of test code using the modified production code;

by executing the computer-executable instructions, searching the first version of test code for code specifying the condition;

by executing the computer-executable instructions, replacing at least the at least one expected value or the at least one expected result, respectively, with the first output value or the first result to provide modified test code;

by executing the computer-executable instructions, determining that at least a second test of the plurality of tests was not failed by the modified production code; and providing a warning to a user that the at least a second test did not fail.

2. The computing system of claim 1, the operations further comprising:

in response to the receiving a request to analyze a first version of production code, making a copy of at least a portion of the first version of production code to provide a copy of the at least a portion of the first version of production code, wherein the replacing at least the at least one expected value or the at least one expected result is performed on the copy of the at least a portion of the first version of production code; and receiving input indicating that the modification to the first version of production code is to be committed.

3. The computing system of claim 1, wherein the determining a modification comprises replacing the at least one expected value with the first output value.

4. The computing system of claim 1, wherein the determining a modification comprises replacing the at least one expected result with the first result.

5. The computing system of claim 1, the operations further comprising:

making a copy of at least a portion of the first version of test code to provide a copy of the at least a portion of the first version of test code, wherein the replacing at least the at least one expected value or the at least one expected result is performed on the copy of the at least a portion of the first version of test code.

6. The computing system of claim 1, wherein the condition comprises:

(1) the output value is not equal to an initial value;
(2) the output value is equal to an initial value;
(3) the output value is equal to a specified value;
(4) the output value is not equal to a specified value;
(5) the output value is one of a plurality of specified values;
(6) the output value is not one of a plurality of specified values;
(7) the output value is within a specified range of values;
(8) the output value is not within a specified range of values; or
(9) a pointer points to a value or object instance.

7. The computing system of claim 1, wherein the determining that a first test specified in the first version of test code was failed comprises checking a Boolean value returned by the first version of test code.

8. The computing system of claim 1, wherein determining a modification to the first version of test code comprises analyzing the first version of test code for tokens or semantic elements in a programming language defining the condition and the at least one expected value or the at least one expected result.

9. The computing system of claim 1, wherein the first version of test code is stored in a first file and the first version of production code is stored in a second file, the first file being different than the second file.

10. The computing system of claim 1, wherein the determining that a first test specified in the first version of test code was failed by the modified production code comprises determining that multiple tests of the plurality of tests specified in the first version of test code were failed by the modified production code and at least the identifying and determining are carried out for the multiple tests.

11. The computing system of claim 10, the operations further comprising:

prompting a user to accept or reject a proposed modification to another test of the multiple tests;

receiving user input rejecting the proposed modification; and receiving user input modifying code of the another test or the modified production code.

12. The computing system of claim 1, the operations further comprising:

by executing the computer-executable instructions, in response the providing the warning, receiving user input modifying the at least a second test or the modified production code.

13. A method, implemented in a computing system comprising a memory and one or more processors by executing computer-executable instructions, comprising:
   receiving user input defining a first version of test code;
   receiving a request to analyze a first version of production code, the first version of test code being specified for the first version of production code, the first version of test code comprising one or more input values to be processed by the first version of production code to provide one or more output values or results;
   receiving a modification to the first version of production code;
   applying the modification to the first version of production code to provide modified production code;
   executing the first version of test code specified for the first version of production code on the modified production code using the one or more input values of the first version of test code to provide a first output value or a first result;
   by executing the computer-executable instructions, determining that a first test of a plurality of tests specified in the first version of test code was failed by the modified production code;
   by executing the computer-executable instructions, identifying a condition specified in the first version of test code responsible for test code failure, the condition specifying at least one expected value or at least one expected result, the at least one expected value or at least one expected result corresponding to an output value or result of the one or more output values or results of processing at least a portion of one or more input values of the first version of test code by the modified production code;
   by executing the computer-executable instructions, determining a modification to the first version of test code to update the condition such that the at least one expected value or the at least one expected result comprises, respectively, the first output value or the first result generated during execution of the first version of test code using the modified production code;
   without user intervention, applying the modification to the first version of test code to provide modified test code, the applying the modification comprising:
      by executing the computer-executable instructions, searching the first version of test code for code specifying the condition; and
      by executing the computer-executable instructions, replacing at least the at least one expected value or the at least one expected result, respectively, with the first output value or the first result to provide modified test code;
      by executing the computer-executable instructions, determining that at least a second test of the plurality of tests was not failed by the modified production code; and
      providing a warning to a user that the at least a second test did not fail.

14. The method of claim 13, wherein the condition comprises:
   (1) the output value is not equal to an initial value;
   (2) the output value is equal to an initial value;
   (3) the output value is equal to a specified value;
   (4) the output value is not equal to a specified value;
   (5) the output value is one of a plurality of specified values;
   (6) the output value is not one of a plurality of specified values;
   (7) the output value is within a specified range of values;
   (8) the output value is not within a specified range of values; or
   (9) a pointer points to a value or object instance.

15. The method of claim 13, further comprising:
   by executing the computer-executable instructions, in response the providing the warning, receiving user input modifying the at least a second test or the modified production code.

16. One or more non-transitory computer-readable storage media comprising:
   computer-executable instructions that, when executed by a computing system comprising at least one hardware processor and at least one memory coupled to the at least one hardware processor, cause the computing system to receive user input defining a first version of test code;
   computer-executable instructions that, when executed by the computing system, cause the computing system to receive a request to analyze a first version of production code, the first version of test code being specified for the first version of production code, the first version of test code comprising one or more input values to be processed by the first version of production code to provide one or more output values or results;
   computer-executable instructions that, when executed by the computing system, cause the computing system to receive a modification to the first version of production code;
   computer-executable instructions that, when executed by the computing system, cause the computing system to apply the modification to the first version of production code to provide modified production code;
   computer-executable instructions that, when executed by the computing system, cause the computing system to execute the first version of test code specified for the first version of production code on the modified production code using the one or more input values of the first version of test code to provide a first output value or a first result;
   computer-executable instructions that, when executed by the computing system, cause the computing system to determine that a first test of a plurality of tests specified in the first version of test code was failed by the modified production code;
   computer-executable instructions that, when executed by the computing system, cause the computing system to identify a condition specified in the first version of test code responsible for test code failure, the condition specifying at least one expected value or at least one expected result, the at least one expected value or at least one expected result corresponding to an output value or result of one or more output values or results of processing at least a portion of the one or more input values of the first version of test code by the modified production code;
   computer-executable instructions that, when executed by the computing system, cause the computing system to determine a modification to the first version of test code to update the condition such that the at least one expected value or the at least one expected result comprises, respectively, the first output value or the first result generated during execution of the first version of test code using the modified production code;

computer-executable instructions that, when executed by the computing system, cause the computing system to search the first version of test code for code specifying the condition;

computer-executable instructions that, when executed by the computing system, cause the computing system to replace at least the at least one expected value or the at least one expected result, respectively, with the first output value or the first result to provide modified test code;

computer-executable instructions that, when executed by the computing system, cause the computing system to determine that at least a second test of the plurality of tests was not failed by the modified production code; and computer-executable instructions that, when executed by the computing system, cause the computing system to provide a warning to a user that the at least a second test did not fail.

17. The one or more non-transitory computer-readable storage media of claim 16, wherein the condition comprises:

(1) the output value is not equal to an initial value;
(2) the output value is equal to an initial value;
(3) the output value is equal to a specified value;
(4) the output value is not equal to a specified value;
(5) the output value is one of a plurality of specified values;
(6) the output value is not one of a plurality of specified values;
(7) the output value is within a specified range of values;
(8) the output value is not within a specified range of values; or
(9) a pointer points to a value or object instance.

18. The one or more non-transitory computer-readable storage media of claim 16, further comprising:

computer-executable instructions that, when executed by the computing system, cause the computing system to, in response the providing the warning, receive user input modifying the at least a second or the modified production code.

* * * * *